United States Patent
Dong et al.

(10) Patent No.: US 10,572,308 B2
(45) Date of Patent: Feb. 25, 2020

(54) METHOD AND APPARATUS FOR MONITORING VIRTUAL DOCUMENT OBJECT MODEL

(71) Applicant: Beijing Xiaomi Mobile Software Co., Ltd., Haidian District, Beijing (CN)

(72) Inventors: Hongguang Dong, Beijing (CN); Hua Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 209 days.

(21) Appl. No.: 15/952,255

(22) Filed: Apr. 13, 2018

(65) Prior Publication Data

US 2019/0012201 A1 Jan. 10, 2019

(30) Foreign Application Priority Data

Jul. 7, 2017 (CN) .......................... 2017 1 0551352

(51) Int. Cl.
| | |
|---|---|
| *G06F 9/48* | (2006.01) |
| *G06F 11/36* | (2006.01) |
| *G06F 11/30* | (2006.01) |
| *G06F 11/14* | (2006.01) |
| *G06F 17/21* | (2006.01) |

(52) U.S. Cl.
CPC ........ *G06F 9/4881* (2013.01); *G06F 11/1479* (2013.01); *G06F 11/3017* (2013.01); *G06F 11/3608* (2013.01); *G06F 17/211* (2013.01)

(58) Field of Classification Search
CPC .................................................... G06F 9/4881
See application file for complete search history.

(56) References Cited

U.S. PATENT DOCUMENTS

| | | | | |
|---|---|---|---|---|
| 2005/0198646 A1* | 9/2005 | Kortela | ................. | G06F 16/957 719/310 |
| 2009/0164592 A1* | 6/2009 | Arthursson | ......... | G06F 9/45504 709/206 |
| 2011/0302485 A1 | 12/2011 | D'Angelo et al. | | |
| 2015/0277963 A1* | 10/2015 | Nishibe | ................... | G06F 16/95 718/102 |

FOREIGN PATENT DOCUMENTS

CN       106502662 A     3/2017

OTHER PUBLICATIONS

Office action from EPO dated Sep. 17, 2018 for EP application 18163619.2.

* cited by examiner

*Primary Examiner* — Charlie Sun
(74) *Attorney, Agent, or Firm* — Jun He Law Offices P.C.; James J. Zhu

(57) ABSTRACT

An apparatus for monitoring a virtual document object model includes: generating, via a first thread, a first VODM node by a first thread and sending the first VODM node to a second thread; comparing, via the second thread, the first VODM node to a second VODM node to be updated so as to determine whether the first VODM node is the same as the second VODM node to be updated, and returning a comparison result to the first thread; and sending, via the first thread, the first VODM node to a third thread when the comparison result indicates that the first VODM node is different from the second VODM node to be updated. The third thread is configured to perform page rendering based on the first VODM node.

20 Claims, 3 Drawing Sheets

METHOD AND APPARATUS FOR MONITORING VIRTUAL DOCUMENT OBJECT MODEL

CROSS REFERENCE TO RELATED APPLICATION

This application is based upon and claims a priority to Chinese Patent Application No. 201710551352.X, filed with the State Intellectual Property Office of P. R. China on Jul. 7, 2017, the entire contents of which are incorporated herein by reference.

TECHNICAL FIELD

The present disclosure generally relates to the field of computer technology, and more particularly, to a method and an apparatus for monitoring a virtual document object model (VODM).

BACKGROUND

In some operating systems such as Android and iOS, when a VODM node on a page is updated, a rendering process (called as a host process generally) renders the page according to the updated VODM node.

For various reasons, the page rendering usually has a stuck problem. How to solve this problem from various aspects becomes a hot spot for front-end engineers.

SUMMARY

In order to solve the problems in related arts, the present disclosure provides a method and an apparatus for monitoring a virtual document object model (VODM).

According to a first aspect of the present disclosure, a method for monitoring a virtual document object model is provided, which includes: generating, via a first thread, a first VODM node and sending the first VODM node to a second thread; comparing, via the second thread, the first VODM node to a second VODM node to be updated so as to determine whether the first VODM node is the same as the second VODM node to be updated, and returning a comparison result to the first thread; and sending, via the first thread, the first VODM node to a third thread when the comparison result received from the second thread indicates that the first VODM node is different from the second VODM node to be updated, wherein the third thread is configured to perform a page rendering based on the first VODM node.

According to a second aspect of embodiments of the present disclosure, an apparatus for monitoring a virtual document object model is provided, which includes: a generating module, configured to generate, via a first thread, a first VODM node and to send the first VODM node to a second thread; a comparing module, configured to compare, via the second thread, the first VODM node to a second VODM node to be updated so as to determine whether the first VODM node is the same as the second VODM node to be updated, and to return a comparison result to the first thread; and a rendering module, configured to send, via the first thread, the first VODM node to a third thread when the comparison result indicates that the first VODM node is different from the second VODM node to be updated, and to perform, via the third thread, page rendering based on the first VODM node.

According to a third aspect of embodiments of the present disclosure, a device for monitoring a virtual document object model is provided, which includes: a processor; and a memory configured to store instructions executable by the processor; in which the processor is configured to perform: generating, via a first thread, a first VODM node and sending the first VODM node to a second thread; comparing, via the second thread, the first VODM node to a second VODM node to be updated so as to determine whether the first VODM node is the same as the second VODM node to be updated, and returning a comparison result to the first thread; and sending, via the first thread, the first VODM node to a third thread when the comparison result received from the second thread indicates that the first VODM node is different from the second VODM node to be updated, wherein the third thread is configured to perform a page rendering based on the first VODM node.

According to a fourth aspect of embodiments of the present disclosure, a nonvolatile computer readable storage medium is provided, when instructions stored in the storage medium are executed by a processor, the processor is able to execute a method for monitoring a virtual document object model according to the first aspect of embodiments of the present disclosure.

It is to be understood that both the foregoing general description and the following detailed description are exemplary and explanatory only and are not restrictive of the present disclosure.

BRIEF DESCRIPTION OF THE DRAWINGS

Accompanying drawings herein are incorporated in and constitute a part of the specification, and illustrate example embodiments in line with the present disclosure, and serve to explain the principle of the present disclosure together with the description.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses and methods consistent with aspects related to the invention as recited in the appended claims.

Figure 1:
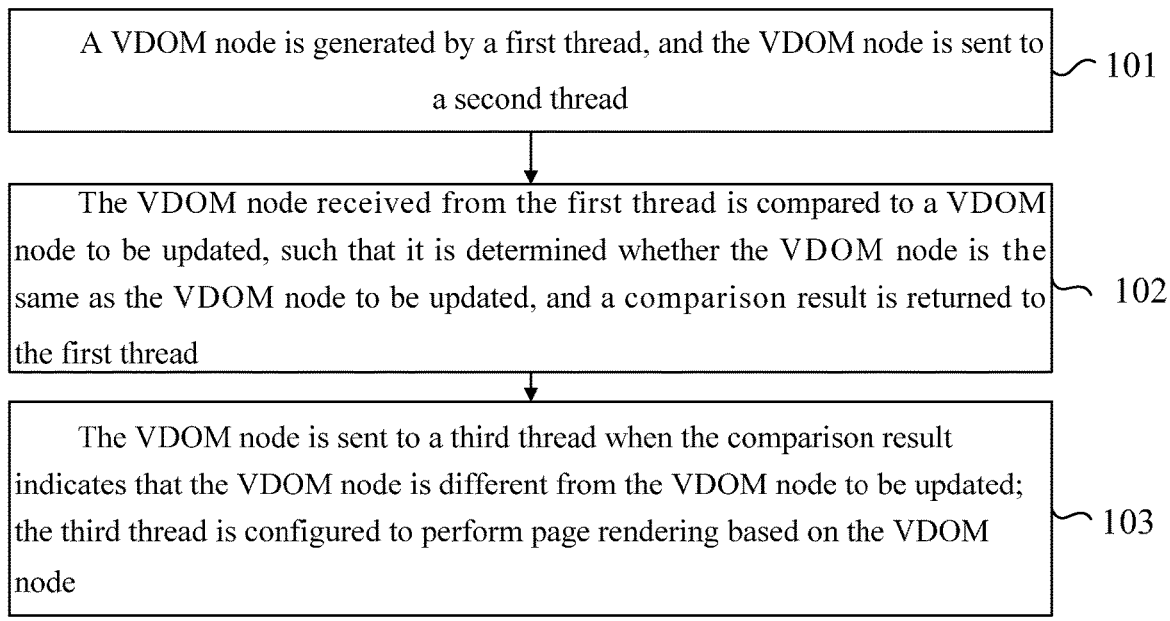
FIG. 1 is a flow chart illustrating a method for monitoring a virtual document object model according to an example embodiment of the present disclosure.

FIG. 1 is a flow chart illustrating a method for monitoring a virtual document object model according to an example embodiment of the present disclosure. The method for monitoring a virtual document object model is applied to apps (short for applications) in a terminal device such as a mobile phone, a computer or the like. The apps may include an app with a navigating function, an app with a video-playing function, or an app with a ticket/air ticket/hotel-booking function or the like. For apps in need of frequent updating wholly or partially while running, the method may improve a page updating speed significantly and solve the page stuck problem effectively. As shown in FIG. 1, the method may include the following steps.

At block S101, a VODM node is generated by a first thread, and the VODM node is sent to a second thread.

In an embodiment, the generated VODM node may include a whole VODM tree of a page, or may only include some nodes of the VODM tree, which may be set by those skilled in the art and will not be limited in embodiments of the present disclosure.

The first thread may generate the VODM node in various scenarios, for example, when new page data is generated at a server-side or a client-side. The present disclosure will not limit the specific manner for generating the VODM node. For example, when sensor data generated by an inertial sensor of a mobile phone has changed, the generated sensor data may be sent to the first thread, and thus the first thread may be triggered to generate a new VODM node, which will be described below.

The first thread may run in a JavaScript (JS) environment.

At block S102, the generated VODM node sent by the first thread is received by the second thread, and the generated VODM node is compared to a VODM node to be updated, such that it is determined whether the generated VODM node is the same as the VODM node to be updated. Accordingly, a comparison result is returned to the first thread.

It can be understood by the skilled in the art that, the VODM node to be updated refers to a node of a VODM tree in a current page. In other words, the VODM node to be updated refers to a node of a VODM tree stored in the second thread before the generated VODM node is received this time from the first thread.

The skilled in the art may use various suitable manners according to actual situations to compare the generated VODM node to the VODM node to be updated, so as to determine whether the generated VODM node is the same as the VODM node to be updated. In an embodiment, for example, two VODM trees may be compared with each other, or only the VODM nodes related to the current updating may be compared with each other, which will not be limited in embodiments of the present disclosure.

In an alternative implementation, the first thread may package the VODM node in a preset packaging format and send the packaged VODM node to the second thread, which will not be limited in embodiments of the present disclosure.

The second thread may be a thread running in the JS environment.

At block S103, the comparison result is received by the first thread from the second thread, and when the comparison result indicates that the generated VODM node is different from the VODM node to be updated, the generated VODM node is sent by the first thread to a third thread. The third thread is configured to perform page rendering based on the generated VODM node sent by the first thread.

In an embodiment, if the generated VODM node is different from the VODM node to be updated, it may indicate that the page needs to be re-rendered. The first thread may send the generated VODM node to the third thread according to the comparison result returned by the second thread, such that the third thread renders the page based on the VODM node.

Embodiments of the present disclosure will not limit the specific manner for rendering the page by the third thread based on the VODM node. The third thread may be a rendering thread or a main thread.

As known by the skilled in the art, it is time-consuming for comparing VODM nodes, and there is a high requirement for instantaneity of the comparison result. At present, functions including generating the VODM nodes and comparing the VODM nodes are performed by a single thread. However, this thread also needs to respond to a callback and an asynchronous request from a third thread (such as a rendering thread, also named as a main thread) and to execute other logics customized by a developer, leading to a difficulty of comparing the VODM nodes in real time. Thus, a frame-drop problem may arise during rendering, i.e., the user may be aware of page stuck. In contrast, according to various embodiments of the present disclosure, comparing the VODM nodes and generating the VODM nodes may be performed separately, and a separate thread (the second thread) is used to perform the function of comparing the VODM nodes, which is beneficial for the third thread to acquire a change of a VODM node in real time and to perform rendering, thereby making a smooth page updating.

In an alternative implementation, the VODM node may be sent to the second thread by the first thread at a preset interval.

The first thread may receive page updating data continuously. However, the page rendering may be performed at certain interval. Therefore, if the first thread generates a VODM node and sends it to the second thread for comparison each time the page updating data is received, a significant amount of intermediate comparison results may not trigger the page rendering, which may be considered as invalid costs. Therefore, the first thread may periodically send an influence of page updating data received in the current period on the VODM node to the second thread once, and the second thread may periodically perform the comparing accordingly, thereby reducing the invalid costs dramatically.

In an alternative implementation, the third thread is configured to perform the page rendering based on the generated VODM node at a preset rendering interval, and the preset rendering interval is the same as the preset interval. Thus, it may not affect the effectiveness of the page rendering but the invalid costs can be avoided as far as possible.

In an alternative implementation, the comparison result may be returned to the first thread by the second thread in real time. Further, in an alternative implementation, when the comparison result indicates that the generated VODM node is different from the VODM node to be updated, the first thread may send the generated VODM node to the third thread in real time. By returning and sending the comparison result in real time, it may speed up the progress of acquiring the changing information of the VODM node by the third thread, thereby making a smooth page updating.

In an alternative implementation, the second thread may be only configured to (in other words, specifically configured to) perform the operations at block S102, i.e., the second thread is only configured to compare the generated VODM node received from the first thread to the VODM node to be updated, so as to determine whether the generated VODM node is the same as the VODM node to be updated, and to return the comparison result to the first thread.

The second thread is only configured to perform the operations at block S102, such that the comparing and the determining may not be interrupted or affected by other operations, thereby acquiring and returning the comparison result is fast and the page updating is smooth.

Embodiments of the present disclosure will be further described with reference to application examples illustrated in FIGS. 2a and 2b in the following. It should be understood that the application examples are used for understanding the embodiments of the present disclosure, rather than limiting the present disclosure in any way.

Figure 2A:
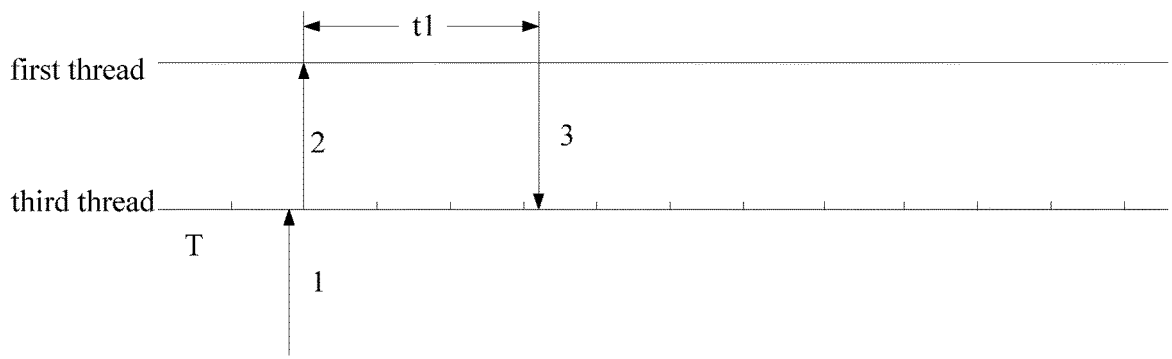
FIG. 2a is a schematic diagram illustrating an example process of monitoring a virtual document object model in related arts.
Figure 2B:
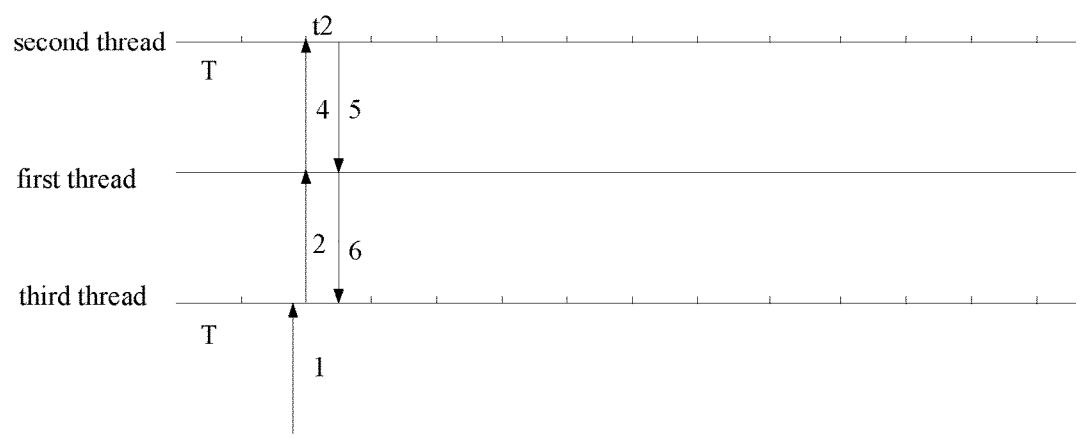
FIG. 2b is a schematic diagram illustrating an example process of monitoring a virtual document object model according to an example embodiment of the present disclosure.

FIG. 2a is a schematic diagram illustrating an example process of monitoring a virtual document object model in related arts, and FIG. 2b is a schematic diagram illustrating an example process of monitoring a virtual document object model according to an example embodiment of the present disclosure.

As shown in FIG. 2a and FIG. 2b, in an example application situation, when a inertial sensor (such as a gyroscope or the like) of a mobile phone detects that the acceleration being monitored has changed, its sensor data may be transferred to a third thread (process 1), and the third thread may transfer the sensor data to a first thread (process 2). Accordingly, the first thread may generate a new VODM node based on the sensor data. For example, a whole VODM tree or only some nodes of the VODM tree may be re-generated according to the sensor data.

As shown in FIG. 2a, according to the related arts, the first thread is not only configured to perform the operation of generating the VODM node, but also configured to perform functions including comparing the generated VODM node to a VODM node to be updated and determining whether the generated VODM node is the same as the VODM node to be updated and the like. Moreover, the first thread may be further configured to execute a callback and an asynchronous request from a third thread and other logics customized by a developer. Therefore, the computing time is relatively long. The comparison result may be acquired after a relatively long time t1 since the generation of the VODM node, and when the comparison result indicates that the generated VODM node is different from the VODM node to be updated, the generated VODM node is sent to the third thread (process 3), such that the third thread renders the page based on the generated VODM node. In this manner, it is difficult to perform the function of comparing the VODM nodes timely, leading to a frame-drop problem during rendering (referring to FIG. 2a, t1 covering a plurality of periods T for rendering the page by the third thread), thereby causing a problem that the content displayed on the page may not reflect the change of the detected data timely, which appears as a page stuck problem in terms of user experience.

As shown in FIG. 2b, according to embodiments of the present disclosure, a first thread itself is not configured to perform the comparing operation. Instead, the first thread is configured to send the generated VODM node to a second thread (process 4). The second thread may be specifically configured to perform the comparing operation and the determining operations without performing other operations. Thus, the comparison result can be obtained and returned to to the first thread (process 5) fast. When the comparison result indicates that the generated VODM node is different from the VODM node to be updated, the first thread is configured to send the generated VODM node to the third thread (process 6), such that the third thread renders the page based on the generated VODM node. Thus, within a short time t2 after the first thread generates the VODM node, the first thread may know the comparison result, such that a smooth page updating is realized.

In an example, the process 5 and the process 6 may be performed in real time to reduce a delay of time.

In an example, as shown in FIG. 2b, the first thread may send the generated VODM node to the second thread according to a preset period T, and the preset period T may be the same as the period for page rendering by the third thread. For example, the preset period may be 16.67 ms. In this way, since the speed of performing the comparing and determining operations by the second thread is fast, the third thread may acquire the VODM node and render the page within one period after the first thread generates and sends out the VODM node, without causing a frame-drop problem, such that the displayed content of the page may reflect the change of the detected data timely, thereby making a smooth page updating.

Figure 3:
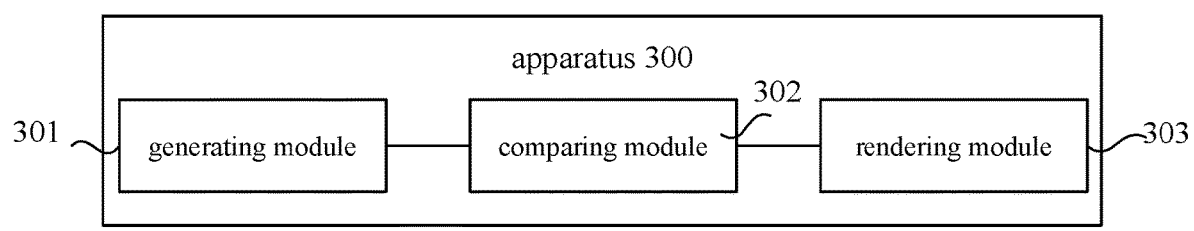
FIG. 3 is a block diagram illustrating an apparatus for monitoring a virtual document object model according to an example embodiment of the present disclosure.

FIG. 3 is a block diagram illustrating an apparatus for monitoring a virtual document object model according to an example embodiment of the present disclosure. The apparatus may be applied in a terminal device such as a mobile phone, a computer or the like. As shown in FIG. 3, the apparatus 300 may include: a generating module 301, a comparing module 302 and a rendering module 303.

The generating module 301 is configured to generate, via a first thread, a VODM node and to send the VODM node to a second thread.

The comparing module 302 is configured to compare, via the second thread, the generated VODM node to a VODM node to be updated, so as to determine whether the generated VODM node is the same as the VODM node to be updated, and to return a comparison result to the first thread.

The rendering module 303 is configured to send, via the first thread, the generated VODM node to a third thread when the comparison result indicates that the generated VODM node is different from the VODM node to be updated. The third thread is configured to perform page rendering based on the generated VODM node.

In an alternative implementation, sending the generated VODM node to the second thread may include: sending the generated VODM node to the second thread at a preset interval.

In an alternative implementation, the third thread is configured to perform the page rendering based on the generated VODM node at a preset interval, and the second preset interval is the same as the first preset interval.

In an alternative implementation, returning the comparison result to the first thread may include returning the comparison result to the first thread in real time.

In an alternative implementation, when the comparison result indicates that the generated VODM node is different from the VODM node to be updated, sending the generated VODM node to the third thread may include: sending the generated VODM node to the third thread in real time when the comparison result indicates that the generated VODM node is different from the VODM node to be updated.

In an alternative implementation, the second thread is only configured to compare the generated VODM node to the VODM node to be updated so as to determine whether the generated VODM node is the same as the VODM node to be updated, and to return the comparison result to the first thread.

The above example description of the apparatus may refer to the example description of the method, which will not be repeated herein.

Figure 4:
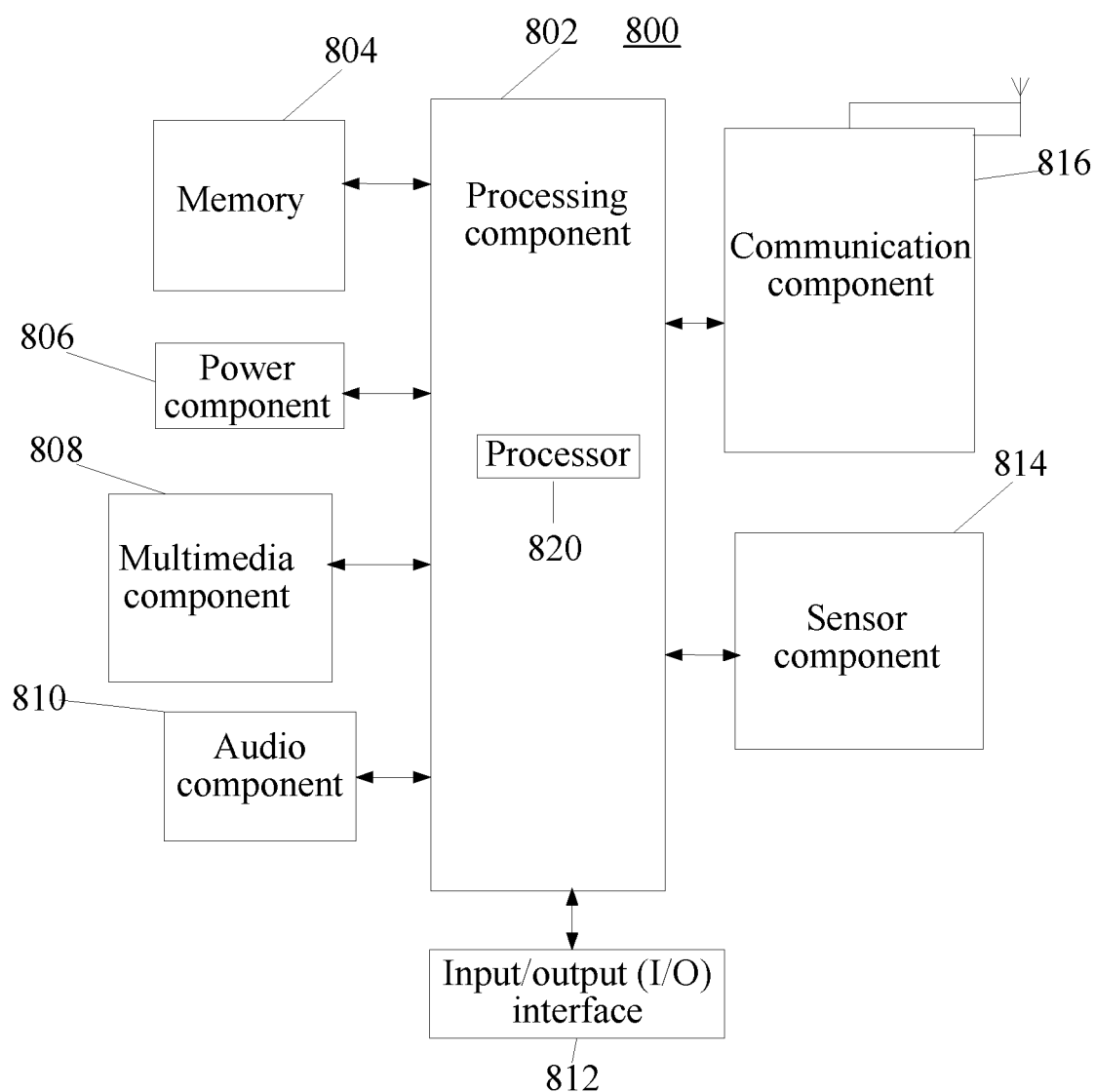
FIG. 4 is a block diagram illustrating a device for monitoring a virtual document object model according to an example embodiment of the present disclosure.

FIG. 4 is a block diagram illustrating a device 800 for monitoring a virtual document object model according to an example embodiment of the present disclosure. For example, the device 800 may be a mobile phone, a computer, a digital broadcasting terminal, a message sending and receiving equipment, a game controller, a tablet device, a medical device, a fitness equipment, a personal digital assistant or the like.

Referring to FIG. 4, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

After the skilled in the art considers the description and practices the present disclosure, it is easy for the skilled in the art to acquire other implementing solutions of embodiments of the present disclosure. The present disclosure is aim at covering all modifications, applications or adaptive changes which abide by the general principle of the present disclosure and includes common knowledge and technical means in the art that are not disclosed herein. The description and the embodiments have been described are merely exemplary. The spirit and scope of the present disclosure are defined by the claims.

It should be understood that the present disclosure is not limited by the above described specific structure illustrated in the drawings and may be modified and changed within the scope of the present disclosure. The scope of the present disclosure is only defined by the claims.

What is claimed is:

1. A method for monitoring a virtual document object model (VODM), comprising:
   generating, via a first thread, a first VODM node and sending the first VODM node to a second thread;
   comparing, via the second thread, the first VODM node to a second VODM node to be updated so as to determine whether the first VODM node is the same as the second VODM node to be updated, and returning a comparison result to the first thread; and
   sending, via the first thread, the first VODM node to a third thread when the comparison result received from the second thread indicates that the first VODM node is different from the second VODM node to be updated, wherein the third thread is configured to perform page rendering based on the first VODM node.

2. The method according to claim 1, wherein sending the first VODM node to the second thread comprises:
   sending the first VODM node to the second thread at a first preset interval.

3. The method according to claim 2, wherein the third thread is configured to perform the page rendering based on the first VODM node at a second preset interval, and the second preset interval is the same as the first preset interval.

4. The method according to claim 1, wherein returning the comparison result to the first thread comprises:
   returning the comparison result to the first thread in real time.

5. The method according to claim 1, wherein sending, via the first thread, the first VODM node to a third thread when the comparison result received from the second thread indicates that the first VODM node is different from the second VODM node to be updated comprises:
   sending the first VODM node to the third thread in real time when the comparison result received from the second thread indicates that the first VODM node is different from the second VODM node to be updated.

6. The method according to claim 1, wherein the second thread is only configured to compare the first VODM node to the second VODM node to be updated so as to determine whether the first VODM node is the same as the second VODM node to be updated, and to return the comparison result to the first thread.

7. The method according to claim 1, before sending the first VODM node to the second thread, the method further comprising:
   packaging the first VODM node in a preset packaging format.

8. The method according to claim 1, wherein the first thread is a thread running in a JavaScript environment, and the second thread is another thread running in the JavaScript environment.

9. An apparatus for monitoring a virtual document object model (VODM), comprising:
   a processor; and
   a memory configured to store instructions executable by the processor;
   wherein the processor is configured to:
      generate, via a first thread, a first VODM node and send the first VODM node to a second thread;
      compare, via the second thread, the first VODM node to a second VODM node to be updated so as to determine whether the first VODM node is the same as the second VODM node to be updated, and return a comparison result to the first thread; and
      send, via the first thread, the first VODM node to a third thread when the comparison result received from the second thread indicates that the first VODM node is different from the second VODM node to be updated, wherein the third thread is configured to perform page rendering based on the first VODM node.

10. The apparatus according to claim 9, wherein the processor is configured to send the first VODM node to the second thread by:
    sending the first VODM node to the second thread at a first preset interval.

11. The apparatus according to claim 10, wherein the third thread is configured to perform the page rendering based on the first VODM node at a second preset interval, and the second preset interval is same as the first preset interval.

12. The apparatus according to claim 9, wherein the processor is configured to return the comparison result to the first thread by:
    returning the comparison result to the first thread in real time.

13. The apparatus according to claim 9, wherein when the comparison result indicates that the first VODM node is different from the second VODM node to be updated, the processor is configured to send the first VODM node to the third thread by:
    sending the first VODM node to the third thread in real time.

14. The apparatus according to claim 9, wherein the second thread is only configured to compare the first VODM node to the second VODM node to be updated so as to determine whether the first VODM node is the same as the second VODM node to be updated, and to return the comparison result to the first thread.

15. The apparatus according to claim 9, wherein the processor is further configured to:
    package the first VODM node in a preset packaging format.

16. The apparatus according to claim 9, wherein the first thread is a thread running in a JavaScript environment, and the second thread is another thread running in the JavaScript environment.

17. A nonvolatile computer readable storage medium, wherein when instructions stored in the storage medium are executed by a processor, the processor is capable to execute a method for monitoring a virtual document object model (VODM), the method comprising:
    generating, via a first thread, a first VODM node and sending the first VODM node to a second thread;
    comparing, via the second thread, the first VODM node to a second VODM node to be updated so as to determine whether the first VODM node is the same as the second VODM node to be updated, and returning a comparison result to the first thread; and
    sending, via the first thread, the first VODM node to a third thread when the comparison result received from the second thread indicates that the first VODM node is different from the second VODM node to be updated, wherein the third thread is configured to perform page rendering based on the first VODM node.

18. The nonvolatile computer readable storage medium according to claim 17, wherein sending the first VODM node to the second thread comprises:
   sending the first VODM node to the second thread at a first preset interval.

19. The nonvolatile computer readable storage medium according to claim 18, wherein the third thread is configured to perform the page rendering based on the first VODM node at a second preset interval, and the second preset interval is the same as the first preset interval.

20. The nonvolatile computer readable storage medium according to claim 17, wherein returning the comparison result to the first thread comprises:
   returning the comparison result to the first thread in real time.

* * * * *